US 9,185,066 B2

(12) United States Patent
Douillet et al.

(10) Patent No.: US 9,185,066 B2
(45) Date of Patent: Nov. 10, 2015

(54) ENABLING WIRELESS DEVICE COMMUNICATION

(75) Inventors: Ludovic Douillet, Escondido, CA (US); Kai Liu, San Diego, CA (US); Nobukazu Sugiyama, San Diego, CA (US); Lobrenzo Wingo, San Diego, CA (US)

(73) Assignee: Sony Corporation, Tokyo (JP)

( * ) Notice: Subject to any disclaimer, the term of this patent is extended or adjusted under 35 U.S.C. 154(b) by 230 days.

(21) Appl. No.: 13/223,948

(22) Filed: Sep. 1, 2011

(65) Prior Publication Data
US 2013/0060862 A1 Mar. 7, 2013

(51) Int. Cl.
*G06F 15/16* (2006.01)
*H04L 12/58* (2006.01)
*G06Q 10/10* (2012.01)

(52) U.S. Cl.
CPC ............. *H04L 51/20* (2013.01); *G06Q 10/10* (2013.01); *H04L 51/04* (2013.01)

(58) Field of Classification Search
CPC ....... H04W 4/02; H04W 4/021; H04W 4/022; H04W 4/023; H04W 4/025; H04L 67/18; H04L 67/24
USPC .................................................. 709/202–206
See application file for complete search history.

(56) References Cited

U.S. PATENT DOCUMENTS

| | | | |
|---|---|---|---|
| 7,200,638 B2* | 4/2007 | Lake | 709/206 |
| 7,366,779 B1* | 4/2008 | Crawford | 709/227 |
| 7,657,616 B1* | 2/2010 | Poling et al. | 709/223 |
| 8,260,266 B1* | 9/2012 | Amidon et al. | 455/414.1 |
| 8,281,239 B2* | 10/2012 | Kuhl et al. | 715/705 |
| 8,606,297 B1* | 12/2013 | Simkhai et al. | 455/456.2 |
| 2002/0060988 A1* | 5/2002 | Shtivelman | 370/259 |
| 2002/0073154 A1* | 6/2002 | Murakami et al. | 709/205 |
| 2003/0018726 A1* | 1/2003 | Low et al. | 709/206 |

(Continued)

OTHER PUBLICATIONS

Allcomputers (Feature Overview of Microsoft Lync Server 2010:Instant Messaging & Web Conferencing, Jul. 24, 2011, Allcomputers.us, http://allcomputers.us/allcomputers_server/feature-overview-of-microsoft-lync-server-2010---instant-messaging---web-conferencing.aspx, pp. 1-3).*

(Continued)

*Primary Examiner* — Brian J Gillis
*Assistant Examiner* — Michael A Keller
(74) *Attorney, Agent, or Firm* — Fitch, Even, Tabin & Flannery LLP (57) ABSTRACT

A wireless communication device is configured to communicate with at least one other electronic user communication device that is connected to communicate on an electronic communication network. The user's device automatically creates a communication list comprising the at least one other electronic user communication device on the network, and the user communication device sends the communication list to a remote server device. So configured, the user communication device can automatically create a communication list of devices with which the user can use instant messaging or chat-like communications, without having to separately discover, search, or otherwise locate such devices and add them as friends or buddies or approved communication devices to a communication list. Accordingly, the electronic user communication device will provide to a user a communication list without additional registration or other set-up procedures.

22 Claims, 5 Drawing Sheets

(56) References Cited

U.S. PATENT DOCUMENTS

| | | | |
|---|---|---|---|
| 2003/0023690 A1* | 1/2003 | Lohtia | 709/206 |
| 2003/0126213 A1* | 7/2003 | Betzler | 709/206 |
| 2004/0156326 A1* | 8/2004 | Chithambaram | 370/310 |
| 2004/0186887 A1* | 9/2004 | Galli et al. | 709/206 |
| 2004/0203746 A1* | 10/2004 | Knauerhase et al. | 455/432.1 |
| 2006/0098588 A1* | 5/2006 | Zhang et al. | 370/255 |
| 2006/0116139 A1* | 6/2006 | Appelman | 455/466 |
| 2006/0142030 A1* | 6/2006 | Coskun et al. | 455/466 |
| 2007/0129108 A1* | 6/2007 | Swanburg et al. | 455/556.1 |
| 2007/0153752 A1* | 7/2007 | Donnellan | 370/338 |
| 2007/0271328 A1* | 11/2007 | Geelen et al. | 709/201 |
| 2007/0282621 A1* | 12/2007 | Altman et al. | 705/1 |
| 2007/0282988 A1* | 12/2007 | Bornhoevd et al. | 709/223 |
| 2008/0133580 A1* | 6/2008 | Wanless et al. | 707/102 |
| 2008/0201419 A1* | 8/2008 | Hung et al. | 709/204 |
| 2008/0263076 A1* | 10/2008 | Duffield et al. | 707/102 |
| 2009/0009343 A1* | 1/2009 | Boyer et al. | 340/573.1 |
| 2009/0106416 A1* | 4/2009 | Cohen et al. | 709/224 |
| 2009/0132660 A1* | 5/2009 | Wyatt | 709/206 |
| 2009/0164235 A1* | 6/2009 | Malik | 705/1 |
| 2009/0180395 A1* | 7/2009 | Wood et al. | 370/252 |
| 2009/0319616 A1* | 12/2009 | Lewis et al. | 709/206 |
| 2010/0035640 A1* | 2/2010 | Lew et al. | 455/466 |
| 2010/0062840 A1* | 3/2010 | Herrmann | 463/25 |
| 2010/0094925 A1* | 4/2010 | St Jacques et al. | 709/202 |
| 2010/0100602 A1* | 4/2010 | Hu et al. | 709/206 |
| 2010/0217809 A1* | 8/2010 | Vymenets et al. | 709/206 |
| 2010/0217837 A1 | 8/2010 | Ansari et al. | |
| 2010/0255778 A1* | 10/2010 | Lovell et al. | 455/41.2 |
| 2011/0016184 A1* | 1/2011 | Wen et al. | 709/206 |
| 2011/0106837 A1* | 5/2011 | Walton et al. | 707/769 |
| 2011/0153747 A1* | 6/2011 | Will | 709/205 |
| 2011/0171903 A1* | 7/2011 | Toebes | 455/14 |
| 2011/0173672 A1* | 7/2011 | Angiolillo et al. | 725/118 |
| 2011/0185290 A1* | 7/2011 | Kim et al. | 715/753 |
| 2011/0238557 A1* | 9/2011 | Barry | 705/37 |
| 2013/0012121 A1* | 1/2013 | Chen et al. | 455/39 |
| 2013/0205375 A1* | 8/2013 | Woxblom et al. | 726/4 |
| 2014/0122136 A1* | 5/2014 | Jayanthi | 705/5 |

OTHER PUBLICATIONS

Choi et al.; "Connect With Things Through Instant Messaging"; IOT 2008 Proceedings of the 1st International Conference on the Internet of Things; Apr. 8, 2008; 14 pages.

* cited by examiner

ENABLING WIRELESS DEVICE COMMUNICATION

TECHNICAL FIELD

This invention relates generally to wireless communication devices and more particularly to automatic configuration of wireless devices to provide user to user communications.

BACKGROUND

User to user chat communication systems are known in the art. Such systems provide an interface for a user where the user inputs a message that appears on a display used by the intended recipient of the message. These systems are typically called "instant messaging" because the message is "instantaneously" send and displayed for the recipient without input from the recipient. Example instant messaging systems are run between computers over the Internet by companies such as YAHOO, AIM, MICROSOFT and the like. In each of these systems, the user must first install a chat application or use a web interface such that the user can communicate with the instant messaging servers that provide the service. After registering with the instant messaging server, the user must then go find and add people with which the user wants to communicate. The process of finding and adding new people or devices with which a user would like to use an instant messaging type service can be time consuming and wasteful especially in a situation where a user wishes to communicate with certain devices in a particular area or within a particular network.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a user wireless communication device is configured to communicate with at least one other electronic user communication device that is connected to communicate on an electronic communication network. The user's device automatically creates a communication list comprising the at least one other electronic user communication device on the network, and the user communication device sends the communication list to a remote server device. So configured, the user communication device can automatically create a communication list of devices with which the user can use instant messaging or chat-like communications, without having to separately discover, search, or otherwise locate such devices and add them as friends or buddies or approved communication devices to a communication list. Accordingly, the electronic user communication device will provide to a user a communication list without additional registration or other set-up procedures. In one such example, upon powering up a communication device configured in accordance with these teachings, the user will only have to select a nickname for the device, and in response to selecting a nickname, the communication device will automatically communicate with other devices, for example, within a home network, to determine which devices are available for a chat-like interface. Once the list of devices available for chat-like communication is compiled by the user electronic device, the user can send chat communications to those devices using software embedded within the user communication device. Moreover, a group chat, where communications are broadcast and displayed in a group of recipient devices, can be used after the initial automatic set-up.

Figure 1:
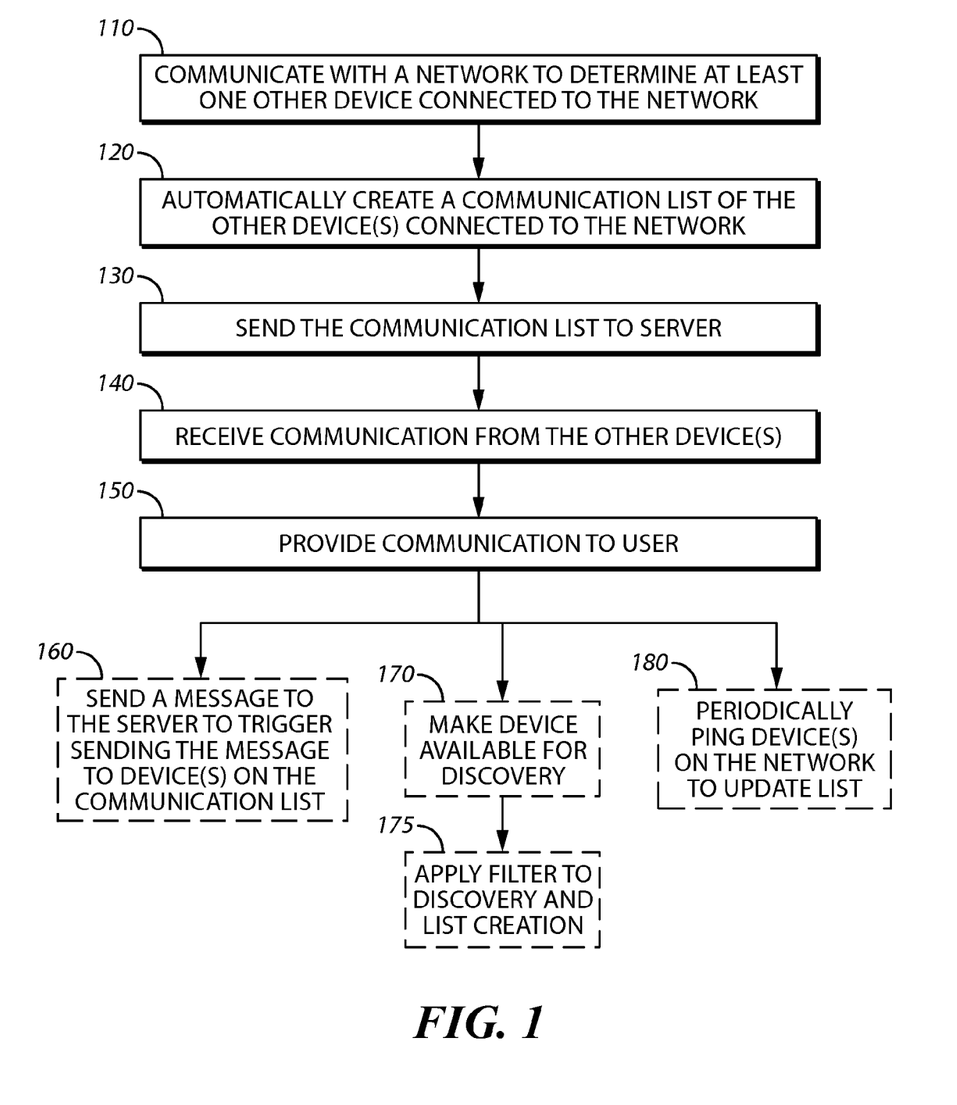
FIG. 1 comprises a flow chart of an example process as configured in accordance with various embodiments of the invention.

These and other benefits may become clearer upon making a thorough review and study of the following detailed description. Referring now to the drawings, and in particular to FIG. 1, an illustrative process operating in the example environment of FIG. 2 that is compatible with many of these teachings will now be presented. An electronic user communication device 205 communicates 110 with an electronic communication network to determine at least one other electronic user communication device 210 and/or 215 connected to communicate on the electronic communication network.

Figure 2:
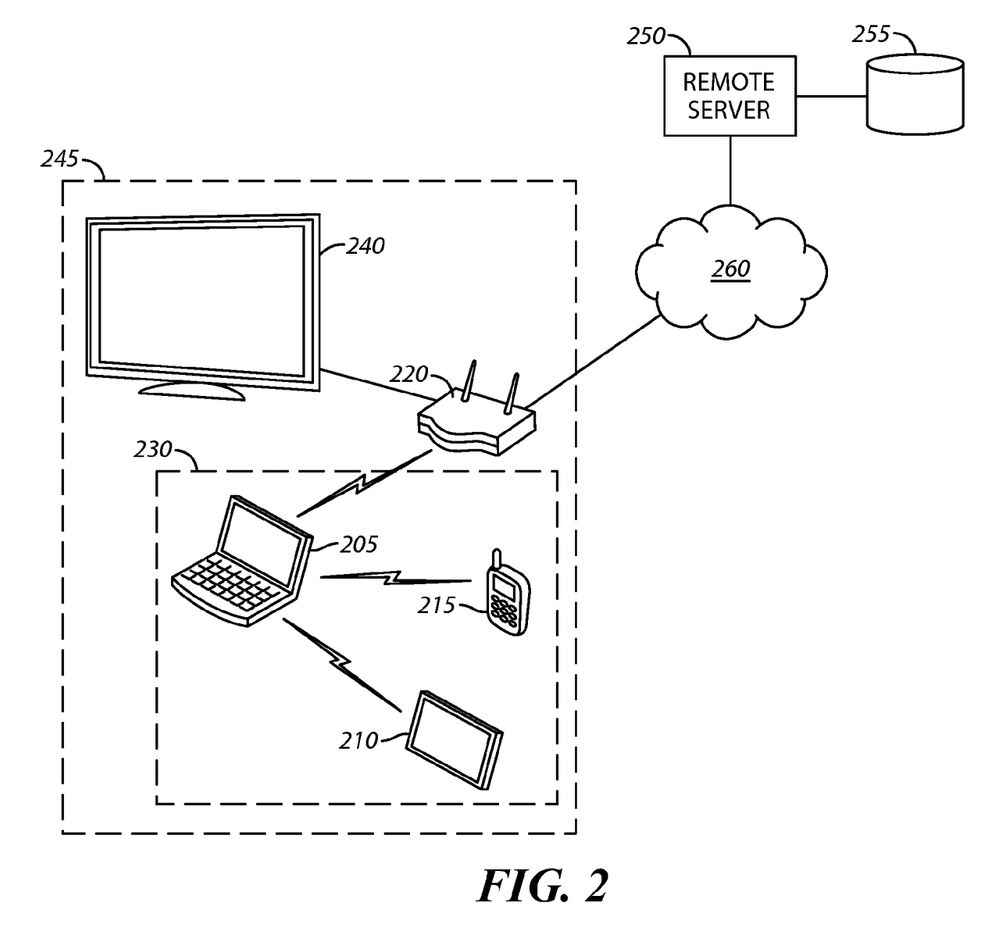
FIG. 2 comprises a block diagram of an example environment in which these teachings can be applied.

By one approach, the electronic communication network can be thought of as that shown in FIG. 2 and designated as network 230 where the electronic communication network 230 comprises a network of devices within a short range wireless communication area in which the devices communicate directly. Example communication methods that can implement such an electronic communication network include Bluetooth, WiFi, and the like. Such an electronic communication network 230 would be applicable for applications in a household, restaurant, coffee shop, bar, or the like where the communication devices 205, 210, and 215 can communicate directly.

In another approach, the electronic communication network comprises that of network 245 of FIG. 2, which is defined by a network of devices connected to a wide area network through a common router 220. In this example, any device that connects through a common router would be considered to be within the electronic communication network. In the example of FIG. 2, a television 240 is connected to communicate through the router 220 and is thus within the electronic communication network 245. The electronic user communication device 205 and devices 210 and 215 can communicate through the router 220 using WiFi and thus are also within the electronic communication network 245. As seen in these examples, the electronic user communication device 205 can be any one of a computer, a tablet computing device, an appliance-based communication device such as a television with user communication features, a mobile phone-type communication device, or the like. These are merely examples of user communication devices that can allow a user to communicate with other users using electronic communication devices connected to a network.

Referring again to the method of FIG. 1 operating in the example of FIG. 2, the electronic user communication device 205 automatically creates 120 a communication list comprising the at least one other electronic communication device 210 and/or 215 connected to the electronic communication network 230. The electronic user communication device 205 sends 130 the communication list to a remote server device 250. In this example, the remote server device 250 may be in communication with a storage element or memory 255 that is local to the server device 250 or remote such as in a cloud storage approach. Communication to the remote server device 250 from the electronic user communication device 205 may take place via any number of communication methods, for example, over the internet or other network 260.

The method also includes receiving 140 an electronic communication from the at least one other electronic user communication device 210 or 215. The electronic communication may include any content such as audio, voice, text, graphics, video, status updates of the electronic communication device, or the like. The electronic user communication device 205 provides 150 the electronic communication for consumption by a user of the electronic user communication device 205. For example, the electronic user communication device 205 may provide a pop-up on a display of the device 205 including the text sent by an electronic communication device 210 created by a user of the electronic communication device 210. Other examples of the electronic communication content and provision thereof to a user of the electronic user communication device 205 are possible, such as automatically playing video or audio, or playing audio in response to selection of the message by a user of the electronic user communication device 205.

So configured, in one example, upon an initial launch of an electronic user communication device in a home setting, the electronic user communication device will automatically create and make available a communication list of devices with which the electronic user communication device can have chat sessions or have instant messaging available. In another application, the electronic user communication device upon initiating a software application or app would automatically create a communication list of electronic communication devices in a particular geographic area, such as within a restaurant or bar with which the user can have instant messaging or other chat-like communication. By defining the network as being within a particular short range wireless communication area or as being the devices that can communicate through a common router, the network is specifically designed such that the communication or instant messaging communication is directed towards a particular class or set of other communication devices, such as for socializing in a public setting or for family communications within a home.

Optional steps to the method of FIG. 1 can include, for example, sending 160 from the electronic user communication device 205 a single message to the remote server device 250 wherein the single message is configured to trigger the remote server device 250 to send at least a portion of the signal message to an electronic user communication device 210 and/or 215 of the communication list. In another optional step, the electronic user communication device 205 makes itself available 170 for discovery by other devices 210 and/or 215 connected to communicate on the electronic communication network. So configured, the electronic user communication device 205 allows itself to be added to the communication list of other electronic devices within the network, thereby allowing users of those other devices to send messages through an instant messaging system or chat system to the electronic user communication device 205.

By one approach, an XMPP type protocol is used by the electronic user communication device 205 to enable the ability to be discovered by other devices connected to the network. XMPP stands for Extensible Messaging and Presence Protocol, which is an open standard communications protocol for message oriented software based on XML (Extensible Mark-Up Language). By one approach, the XMPP type protocol running on the electronic communication device 205 exposes an IP (Internet Protocol) address of the electronic user communication device 205 to be discovered by other devices operating with software compatible with this approach. The electronic user communication device 205 places its IP address on the network to define the device 205 for other electronic communication devices 210 and/or 215 connected to the network. This functionality can be realized using a number of software protocols, including, for example, XMPP's XEP-0030 and mDNS (Multicast Domain Name System)/DNS-SD (Service Delivery). The mDNS/DNS-SD protocol can be implemented using software implementations known in the art such as Avahi or Bonjour. Device specific XML software tags are added to discovery messages sent by the various devices. The device specific tags can include various elements, for example, device identification information, device type information, and device capability information. If the device specific tags match for a given device than what is expected for the system, the device that sent the discovery message is added to the communication list.

The method of FIG. 1 may further optionally include applying 175 a filter to control which of the other electronic communication devices 210 and/or 215 are added to the communication list and to limit which of the other devices 210 and/or 215 can discover the electronic user communication device 205. So configured, a user may configure the electronic user communication device 205 to block certain electronic communication devices 210 and 215 operating within the electronic communication network from the created communication list. Similarly, the user may create options whereby the electronic user communication device 205 is not available to be added to certain other device's 210 and/or 215 communication lists operating within the electronic communication network. For instance, the electronic user communication device 205 may filter other devices 210 and/or 215 based on the extra software tags included in the device discovery messages sent by those devices. To stop its inclusion in other devices' communication lists, the electronic user communication device 205 includes information embedded in tags with its device discovery message to block its inclusion in a given list or not send a device discovery message at all.

In yet another optional approach, the method of FIG. 1 may further include periodically pinging 180 devices 210 and 215 connected to communicate on the electronic communication network to determine individual statuses for individual ones of the devices 210 and 215 on the communication list and to add devices connected to communicate on the electronic communication network connected since a last ping to the devices on the communication list. So configured, the electronic user communication device 205 can continually update the communication list to add additional devices that are added to communicate on the electronic communication network and to remove devices that have been removed from the communication network such that the communication list is up to date for the user. Moreover, in one approach, the electronic user communication device 205 can provide for the user a current status for each of the devices connected to communicate on the electronic communication network or on the communication list.

In this approach, periodically pinging the devices will provide a most recent status for the user of the electronic user communication device 205. In one example, where the user communication device 205 is operating in a household environment, the electronic communication devices in other rooms of the household can provide an update to the user with respect to their statuses such as whether various devices are engaged in a particular activity or to provide statuses of people using those devices as input by those users. In one approach, an electronic communication device 205 may use an XMPP type protocol designed to periodically detect devices connected to communicate on the electronic communication network to determine individual statuses for individual ones of the devices and to add the devices connected to communicate on the electronic communication network connected since a last ping to the communication list. This functionality can be implemented using the software approaches discussed above, as but one example being the use of software tags added to device discovery messages designed to cause a receiving device to respond with a current status. Other standards or communication protocols may be used other than an XMPP.

Figure 3:
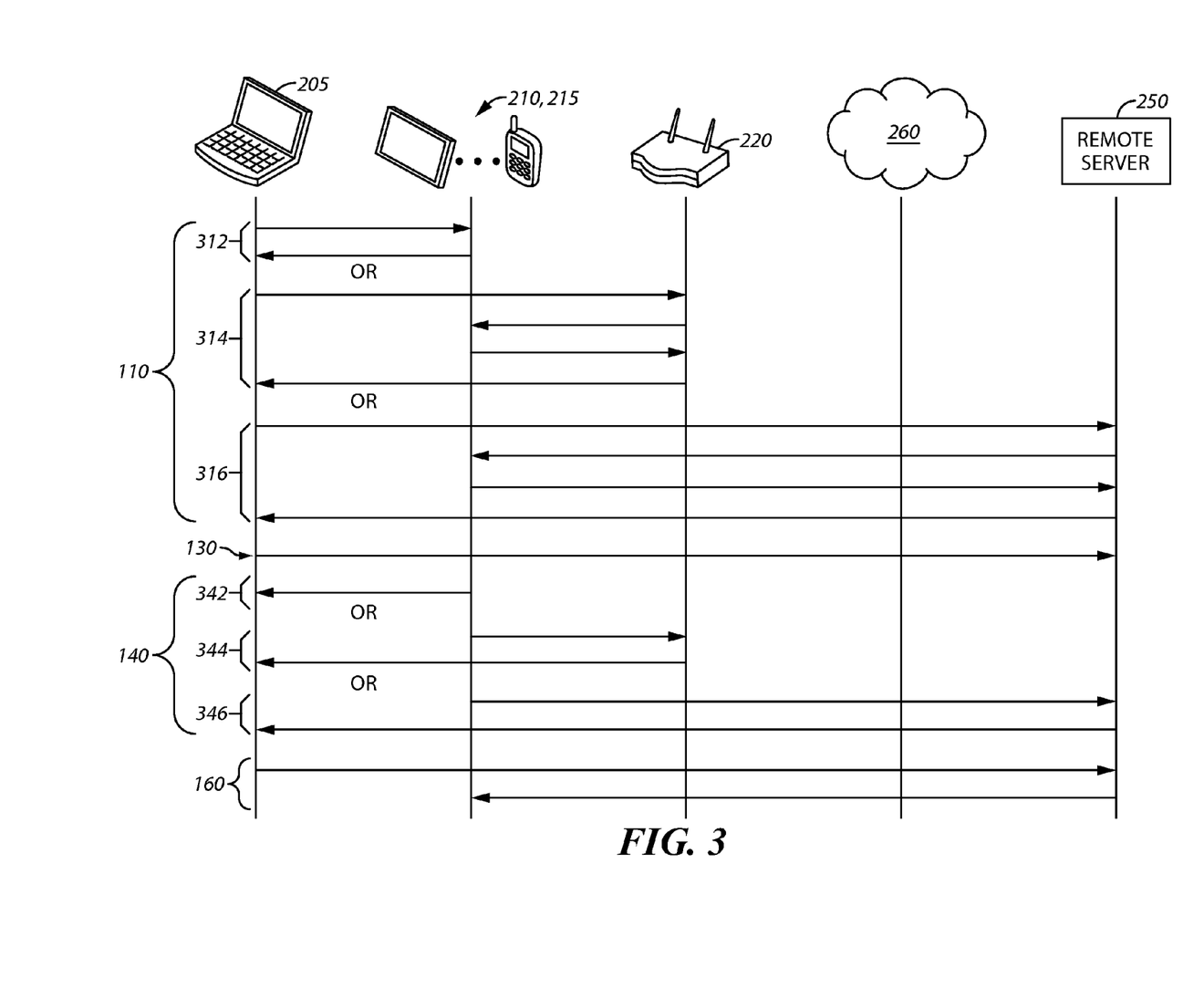
FIG. 3 comprises a communication flow diagram of an example communication process as configured in accordance with various embodiments of the invention.

With reference to FIG. 3, various approaches to executing the methods described above with respect to FIG. 1 will be described. Step 110 of the method of FIG. 1 is illustrated in FIG. 3 as having three potential approaches. In the first approach of FIG. 3, designated by number 312, the electronic user communication device 205 communicates directly with the other communication devices 210 and 215 to determine the other devices connected to the network. In this example, the electronic user communication device 205 can communicate with the other communication devices 210 and 215 using communication standards such as Bluetooth, WiFi, or the like that enable direct communication between devices. In a second approach, designated by number 314, the electronic user communication device 205 communicates first with the router 220, which in turn communicates with the other electronic communication devices 210 and 215. Based on that communication, the router 220 then relays the communication back to the electronic user communication device 205. This approach would be used where the electronic communication network is defined by the router 220, in other words where the network is defined by the devices that communicate through a common router 220. In a third approach, designated by number 316, the electronic user communication device 205 communicates first with a remote server 250 potentially through a router 220 and a network 260. The remote server 250 in turn initiates communication with the other communication devices 210 and 215, for example, through the network 260 and router 220. The remote server 250 then receives the response back from the other communication devices 210 and 215 and, in turn, provides that response back to the electronic user communication device 205 for creation of the communication list. An example of such a system is where a remote server serves as a clearinghouse or as a backbone for communication among various communication devices. In this way the electronic communication network can be defined by communication devices grouped together via a protocol at their remote server 250. Once the communication list is created by the user electronic communication device 205, the list is sent to the remote server 250 and stored, potentially at the remote server's database 255.

The electronic user communication device 205 can then receive communications from the other devices 210 or 215 in one or more of three different examples as shown in FIG. 3. In the first approach, designated by number 342, the electronic user communication device 205 directly receives the communication from the other devices 210 or 215, such as in the approach where the various devices are in direct communication via a protocol such as Bluetooth or WiFi. In a second approach, designated by number 344, the other devices 210 and 215 send the communication to the common router 220, which in turn relays the communication to the electronic user communication device 205. In a third approach, designated by number 246, the other devices 210 and 215 send the communication first to the remote server 250, for example, through the router 220 and/or network 260, which remote server 250 in turn, relays the communication to the electronic user communication device 205. Under each of these approaches, the electronic user communication device 205 then provides the communication received from the devices 210 and/or 215 for consumption by the user as described above.

The optional step 160 described above with respect to FIG. 1 is illustrated in FIG. 3 showing how a group communication can be sent from the user electronic communication device 205. Here, if the user wants to send a common message to each of the devices on a communication list, the electronic user communication device 205 sends that group message to the remote server 250, for example, through the router 220 and/or the network 260. The remote server 250, which stores the communication list, then takes that group message and sends it to the devices on the communication. For example, if the communication list includes the devices 210 and 215, the remote server will then send the group message to those devices 210 and 215, for example, through the network 260 and the router 220. So configured, the user electronic communication device 205 can use the automatically created communication list to send group messages to all of the devices on the communication list, which can be useful, for example, in a household setting where a member of the family wishes to send a message such as "dinner's ready" to each of the users of the various other electronic communication devices throughout the house.

Figure 4:
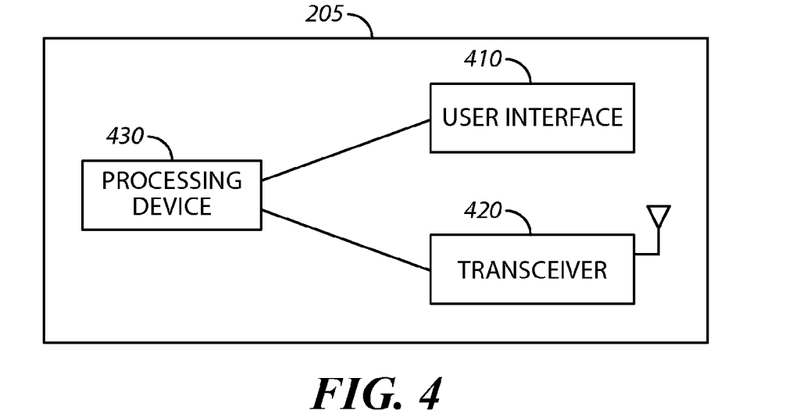
FIG. 4 comprises a block diagram of an example communication device as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform will now be provided. The apparatus of the electronic user communication device 205 includes a user interface device 410. The user interface device 410 can comprise any number of known apparatuses for providing a human interface for an electronic communication device such as a touch interface, keyboard, mouse, user gesture sensing controls, or the like. The apparatus also includes a wireless transceiver 420 such as those known in the art that allow for a wireless communication via any number of wireless communication protocols. A processor device 430 is in communication with the user interface device 410 and the wireless transceiver 420. Those skilled in the art will recognize and appreciate that such a processor device 430 can comprise a fixed-purpose hard-wired platform or can comprise a partially or wholly programmable platform. All of these architectural options are well known and understood in the art and require no further description here.

Those skilled in the art will also recognize and understand that such an apparatus may be comprised of a plurality of physically distinct elements as is suggested by the illustration shown in FIG. 4. It is also possible, however, to view this illustration as comprising a logical view, in which case one or more of these elements can be enabled and realized via a shared platform. It will also be understood that such a shared platform may comprise a wholly or at least partially programmable platform as are known in the art.

The processor device 430 in this example is configured to control the wireless transceiver 420 to communicate with at least one other electronic user communication device connected to communicate on an electronic communication network such as those described above. The processor device 430 is also configured to automatically create a communication list comprising the at least one other electronic user communication device and to control the wireless transceiver 420 to send the communication list to a remote server device. The user interface device 410 in one approach is configured to receive input to define an electronic message and the processor device 430 is configured to send the electronic message to the remote server to trigger the remote server to send the electronic message to an electronic user communication device of the communication list. By one approach, the processor device 430 is configured to control the wireless transceiver 420 to periodically ping the devices connected to communicate on the electronic communication network to determine individual statuses for individual ones of the devices and to add devices connected to communicate on the electronic communication network connected since the last ping to the devices on the communication list. So configured, the user electronic communication device 205 can update the communication list created by the processor device 430. By one approach, the processor device 430 is configured to use an XMPP type protocol to periodically detect devices connected to communicate on the electronic communication network to determine the individual status. In still another approach, the processor device 430 is configured to use an XMPP type protocol or other approach as described above to make the electronic user communication device 205 available for discovery by other devices connected to communicate on the electronic communication network. The electronic user communication device 205 can be one of a computer, tablet communication device, an appliance based communication device, or mobile phone type communication device among other options.

Figure 5:
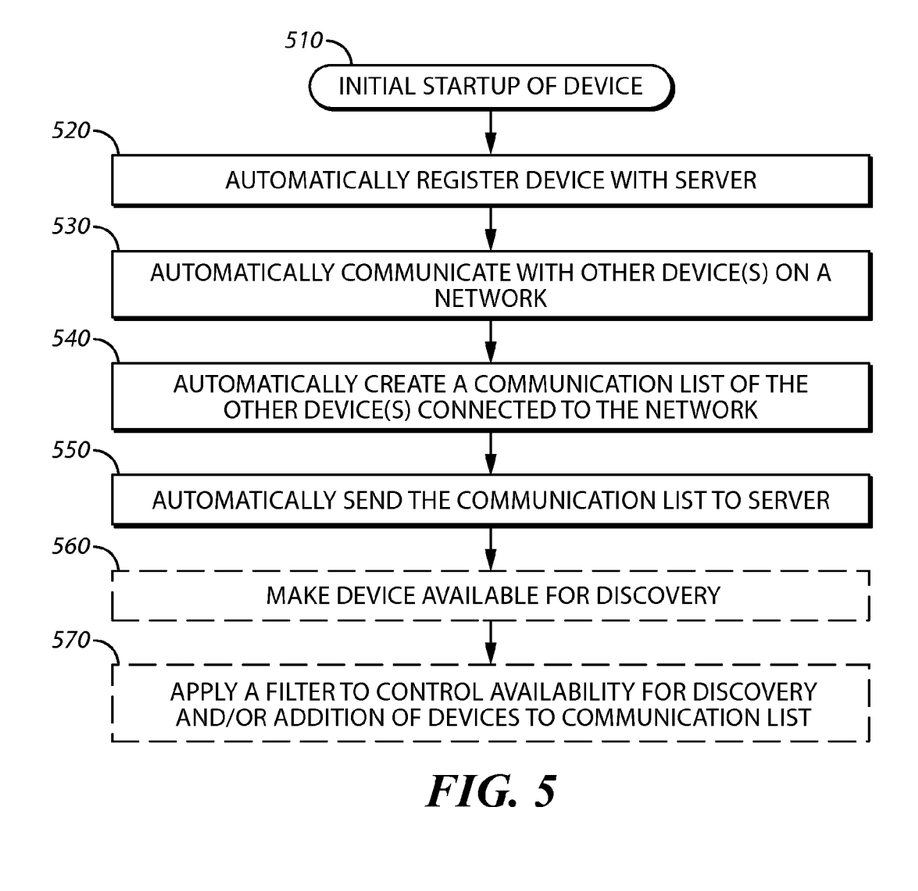
FIG. 5 comprises a flow chart of an example startup process as configured in accordance with various embodiments of the invention.

Referring now to FIG. 5, an example initial start-up method for an electronic user communication device will be described. The example method includes in response to an initial start-up 510 of an electronic user communication device automatically registering 520 the electronic user communication device with the remote server device and automatically communicating 530 with at least one other electronic user communication device connected to communicate on an electronic communication network. The method further includes in response to the initial start-up, the electronic user communication device's automatically creating 540 a communication list comprising the at least one other electronic user communication device. The method also includes automatically sending 550 the communication list to a remote server device configured to route the message from the electronic communication device to devices on the communication list. The electronic user communication device can be any one of the computer, a tablet computing device, an appliance based communication device or a mobile phone type communication device, or the like. The electronic communication network may be a network of devices connected to a wide area network through a common router or may be a network of devices within a short range wireless communication area such as using a Bluetooth, WiFi, or the like, similar to the electronic communication network options discussed above. Optionally, at 560, the method includes using an XMPP type protocol to make the electronic user communication device available for discovery by other devices connected to communicate on the electronic communication network. Another optional step at 570 includes applying a filter to control which of the least one other electronic user communication devices are added to the communication list and to limit which of the other devices can discover the electronic user communication device itself.

In an additional alternative approach, the functionality or logic described in FIGS. 1 and 5 may be embodied in the form of code that may be executed in a separate processor circuit such as the processor device 430 of FIG. 4. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s). The program instructions can be stored in a computer readable medium such as a memory or other storage device for reading by a computer or processor device.

So configured, an electronic user communication device can automatically discover and create a communication list that can then be used by the electronic user communication device to provide a user with instant messaging or chat functions with respect to these other devices that are connected to communicate over the electronic communication network, without forcing the user to separately initiate or add the devices to the list. For example, in a home setting, upon starting up the electronic user communication device, it will automatically find other compatible devices that are operating within the home either through WiFi or Bluetooth connections or because the devices are all connected to communicate a common router for the home or both. The user electronic communication device can then send a message using a chat program to any of those other devices located within the home. In a more public setting, a device can run through the method of FIG. 5 in response to an initial start-up of a software application. In one such example, a user having a mobile phone, a tablet, or other portable computing device can start a program in a public area such as a coffeehouse, park, a restaurant, or a bar, and in response to the initial start-up of the application, the electronic user communication device will run through the steps of FIG. 5 to create a communication list of other devices compatible with this approach that are within the electronic communication network. Such an approach can facilitate social interactions in such public areas and may be integrated with other social or networking applications. In such an application of these teachings, the user can define the filter to provide a desired level of privacy when creating the communication list or by defining how other devices are allowed to find the user's electronic communication device in a particular area.

Figure 6:
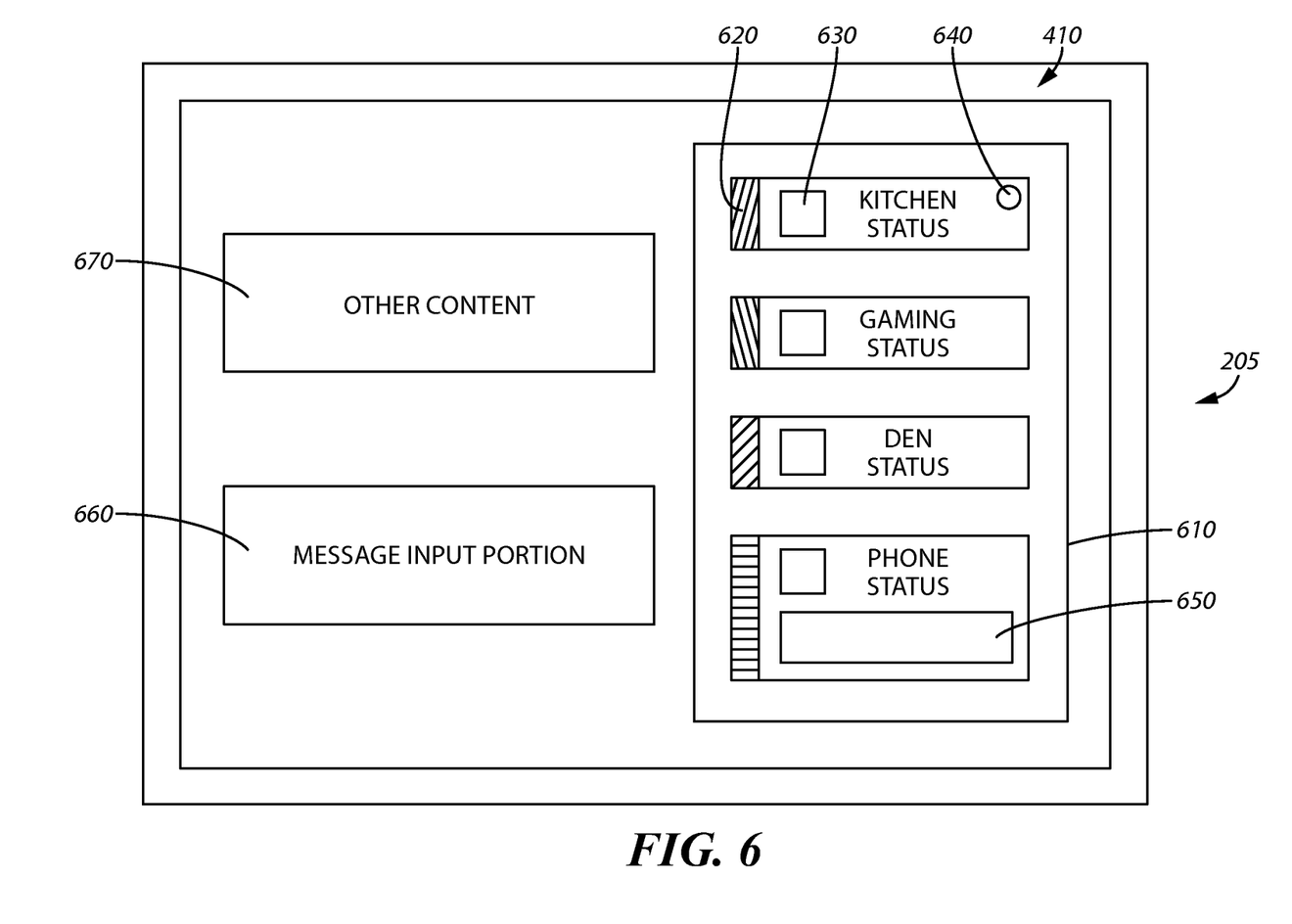
FIG. 6 comprises an example user interface for a device as configured in accordance with various embodiments of the invention.

With reference to FIG. 6, an example interface for an electronic user communication device will be described. The electronic user communication device 205 includes a user interface 410. In this example, the user interface 410 is a touch screen having various areas designed to provide interaction with the user. In a first area 610 on the right hand side of the user interface 410, a list of devices on the communication list is provided to the user. Each device listed in the area 610 includes a color indicator 620 to allow visual distinction among the various devices in addition to optional display of a text name for each of the devices. An avatar or icon 630 is optionally included with each of the device descriptions to further distinguish each device. A message icon 640 is displayed in connection with one of the device indicators when a message is either received from that particular device or sent to that particular device of the communication list. In another approach, an area 650 is provided in connection with the device of the list in which text or video or other messaging content can be displayed as received from that particular device. On the left hand side of the user interface 610 are two additional areas, one portion of the device is dedicated to providing message input 660 for drafting messages to send to various other devices on the communication list. Another area 670 can be set aside for displaying other content as may be related to the electronic user communication device 205.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method comprising:
    communicating from an electronic user communication device connected to a WiFi network with the WiFi network to discover at least one other electronic user communication device connected to the WiFi network;
    creating an instant message contact list for the electronic user communication device, the instant message contact list indicating discovered devices connected to the WiFi network with which the electronic user communication device is allowed to communicate over the WiFi network and including the at least one other electronic user communication device;
    sending the instant message contact list from the electronic user communication device connected to the WiFi network to a server device remote to the WiFi network and in communication with the WiFi network over an internet connection;
    sending, over the WiFi network, an instant message electronic communication from the at least one other electronic user communication device connected to the WiFi network and on the instant message contact list to the electronic user communication device connected to the WiFi network;
    displaying the instant message electronic communication to a user of the electronic user communication device in response to receiving the instant message electronic communication over the WiFi network at the electronic user communication device;
    further comprising applying a filter to control which of the at least one other electronic user communication device is added to the instant message contact list and to limit which of the at least one other electronic user communication device can discover the electronic user communication device; and
    further comprising blocking the electronic user communication device from an instant message contact list of the at least one other electronic user communication device by sending a discovery message from the electronic user communication device to the at least one other electronic user communication device, the discovery message including information embedded in tags and configured to block the electronic user communication device from being added to the instant message contact list of the at least one other electronic user communication device.

2. The method of claim 1 further comprising sending a single instant message to the remote server device, the single instant message configured to trigger the server device to send at least a portion of the single instant message to electronic user communication devices of the instant message contact list.

3. The method of claim 1 wherein the at least one other electronic user communication device in communication with the WiFi network comprises a network of devices connected to a wide area network through a common router.

4. The method of claim 1 wherein the at least one other electronic user communication device in communication with the WiFi network comprises a network of devices within a short range wireless communication area.

5. The method of claim 1 wherein the electronic user communication device comprises one of a computer, a tablet computing device, an appliance based communication device, or a mobile phone-type communication device.

6. The method of claim 1 further comprising periodically pinging devices connected to the WiFi network to determine individual statuses for individual ones of the devices and to add devices connected to the WiFi network connected since a last ping to devices on the instant message contact list.

7. The method of claim 1 further comprising using an XMPP-type protocol to periodically detect devices connected to the WiFi network to determine individual statuses for individual ones of the devices and to add devices connected to the WiFi network connected since a last ping to devices on the instant message contact list.

8. The method of claim 1 further comprising using an XMPP-type protocol to make the electronic user communication device available for discovery by the at least one other electronic user communication device in communication with the WiFi communication network.

9. The method of claim 1, further comprising blocking the at least one other electronic user communication device from the instant message contact list in response to recognizing extra software tags included in device discovery messages received by the electronic user communication device from the at least one other electronic user communication device.

10. A method comprising:
    in response to initial startup of an electronic user communication device:
    automatically communicating from the electronic user communication device connected to a WiFi network with the WiFi network to discover at least one other electronic user communication device connected to the WiFi network;
    automatically creating an instant message communication list for the electronic user communication device, the instant message communication list indicating discovered devices connected to the WiFi network with which the electronic user communication device is allowed to communicate over the WiFi network and including the at least one other electronic user communication device;

automatically registering with a server device remote to the WiFi network and in communication with the WiFi network over an internet connection;

automatically sending the instant message communication list from the electronic user communication device connected to the WiFi network to the server device;

routing an instant message received at the server device from the electronic user communication device connected to the WiFi network to the at least one other electronic user communication device connected to the WiFi network and on the instant message communication list;

applying a filter to control which of the at least one other electronic user communication device is added to the communication list and to limit which of the at least one other electronic user communication device can discover the electronic user communication device; and blocking the electronic user communication device from a communication list of the at least one other electronic user communication device by sending a discovery message from the electronic user communication device to the at least one other electronic user communication device, the discovery message including information embedded in tags and configured to block the electronic user communication device from being added to the communication list of the at least one other electronic user communication device.

11. The method of claim 10 wherein the at least one other electronic user communication device in communication with the WiFi network comprises a network of devices connected to a wide area network through a common router.

12. The method of claim 10 wherein the at least one other electronic user communication device in communication with the WiFi network comprises a network of devices within a short range wireless communication area.

13. The method of claim 10 wherein the electronic user communication device comprises one of a computer, a tablet computing device, an appliance based communication device, or a mobile phone-type communication device.

14. The method of claim 10 further comprising using an XMPP-type protocol to make the electronic user communication device available for discovery by the at least one other electronic user communication device in communication with the WiFi network.

15. The method of claim 10, further comprising blocking the at least one other electronic user communication device from the communication list in response to recognizing extra software tags included in device discovery messages received by the electronic user communication device from the at least one other electronic user communication device.

16. An apparatus comprising:
a user interface device;
a wireless transceiver;
a processor device in communication with the user interface device and the wireless transceiver, the processor device configured to:
control the wireless transceiver to connect to a WiFi network to discover at least one other electronic user communication device connected to the WiFi network;
automatically create an instant message communication list indicating discovered devices connected to the WiFi network with which the electronic user communication device is allowed to communicate over the WiFi network and including the at least one other electronic user communication device;
control the wireless transceiver to send the instant message communication list to a server device remote to the WiFi network and in communication with the WiFi network over an internet connection;
wherein the processor device is further configured to apply a filter to control which of the at least one other electronic user communication device is added to the instant message communication list and to limit which of the at least one other electronic user communication device can discover the apparatus; and
wherein the processor device is configured to block the apparatus from an instant message communication list of the at least one other electronic user communication device by sending a discovery message from the wireless transceiver to the at least one other electronic user communication device, the discovery message including information embedded in tags and configured to block the apparatus from being added to the instant message communication list of the at least one other electronic user communication device.

17. The apparatus of claim 16 wherein the user interface device is configured to receive inputs to define an electronic instant message and the processor device is configured to send the electronic instant message to the server device to trigger to the server device to send the electronic instant message to electronic user communication devices of the instant message communication list.

18. The apparatus of claim 16 wherein the apparatus comprises one of a computer, a tablet computing device, an appliance based communication device, or a mobile phone-type communication device.

19. The apparatus of claim 16 wherein the processor device is configured to control the wireless transceiver to periodically ping devices connected to the WiFi network to determine individual statuses for individual ones of the devices and to add devices connected to the WiFi network connected since a last ping to devices on the instant message communication list.

20. The apparatus of claim 16 wherein the processor device is configured to use an XMPP-type protocol to periodically detect devices connected to the WiFi network to determine individual statuses for individual ones of the devices and to add devices connected to the WiFi network since a last ping to devices on the instant message communication list.

21. The apparatus of claim 16 wherein the processor device is configured to use an XMPP-type protocol to make the electronic user communication device available for discovery by the at least one other electronic user communication device connected to the local WiFi network.

22. The apparatus of claim 16, wherein the processor device is further configured to block the at least one other electronic user communication device from the instant message communication list in response to recognizing extra software tags included in device discovery messages received by the apparatus from the at least one other electronic user communication device.

* * * * *